United States Patent [19]
Bowers

[11] 3,783,877
[45] Jan. 8, 1974

[54] BODY IMPLANTABLE STIMULATOR BATTERY UTILIZATION CIRCUIT

[75] Inventor: David L. Bowers, Wauwatosa, Wis.

[73] Assignee: General Electric Company, Milwaukee, Wis.

[22] Filed: Apr. 26, 1971

[21] Appl. No.: 137,418

[52] U.S. Cl............................ 128/419 P, 128/421
[51] Int. Cl............................................. A61n 1/36
[58] Field of Search.................... 128/419 P, 419 R, 128/418, 411, 404; 340/407; 320/45; 307/64–66, 53, 55, 80, 86, 87

[56] References Cited
UNITED STATES PATENTS

| | | | |
|---|---|---|---|
| 3,620,220 | 11/1971 | Murphy, Jr...................... | 128/419 P |
| 2,134,028 | 10/1938 | Caldwell........................... | 340/407 |
| 3,108,268 | 10/1963 | Uttal................................. | 128/411 |

FOREIGN PATENTS OR APPLICATIONS

| | | | |
|---|---|---|---|
| 225,033 | 12/1958 | Australia......................... | 128/419 R |

*Primary Examiner*—William E. Kamm
*Attorney*—Ralph G. Hohenfeldt, Frank L. Neuhauser, Oscar B. Waddell, Joseph B. Forman and James E. Espe

[57] ABSTRACT

Paralleled sets of batteries are used to supply power to an implantable electric organ stimulator stimulus signal generator. Each set has a device having the characteristics of a diode connected in series with it. The diodes have different forward voltage characteristics. One preferred set of batteries supplies current initially and the others do not deliver current unless the preferred battery is near depletion or unless there is a high current drain from the batteries. In one embodiment, a mild but perceptible physical sensation is produced to warn a patient of impending battery depletion.

2 Claims, 7 Drawing Figures

PATENTED JAN 8 1974 3,783,877
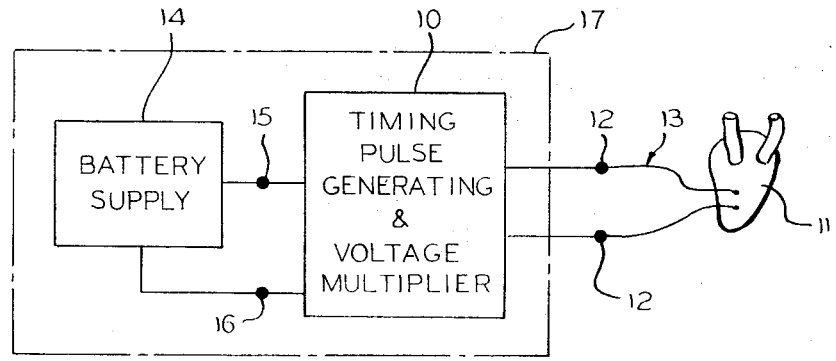
FIG.1
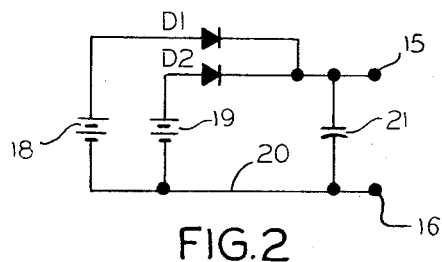
FIG.2
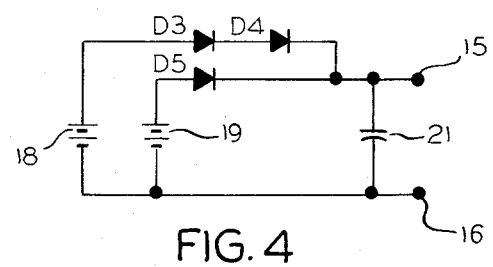
FIG.4
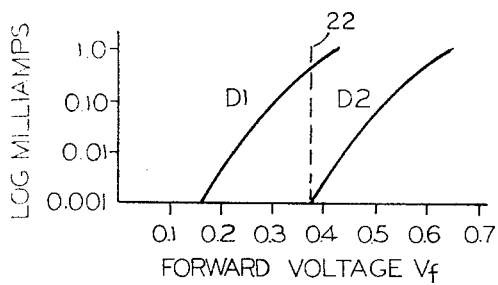
FIG.3
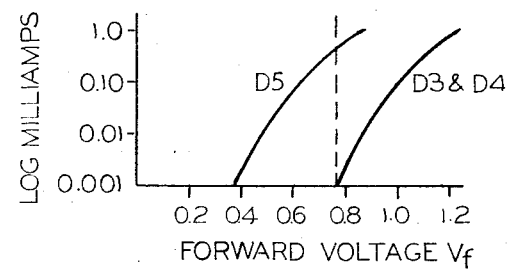
FIG.5
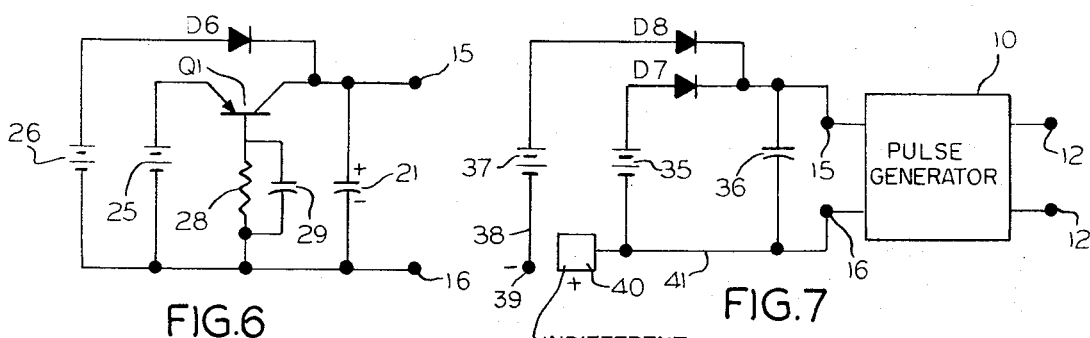
FIG.6
FIG.7
INVENTOR
DAVID L. BOWERS
BY *Wiviott & Hohenfeldt*
ATTORNEYS

BODY IMPLANTABLE STIMULATOR BATTERY UTILIZATION CIRCUIT

BACKGROUND OF THE INVENTION

Early implantable body organ stimulators such as cardiac pacers employed several series connected battery cells as a power supply for the stimulus pulse generator. Occasionally, one cell in the series would fail prematurely while the other cells were far from being depleted. However, failure of one or more cells in a cardiac pacer usually resulted in a stimulating pulse rate change, or in some instances, inadequate pulse energy for effective stimulation, in which case the stimulator had to be replaced surgically as soon as possible. Logic and statistics dictate that having a number of cells in series increases the probability of one cell failing and disabling the others. Hence, it was proposed to connect fewer cells in series, to connect series groups in parallel, and to use the voltage double and tripler circuits for producing sufficiently high voltage for effective stimulation. In this arrangement, an identical diode is used in each series group to prevent the good cells from delivering current to the defective cells in another group. The cells in each group constantly divide the load current and all cells discharge at a substantially equal rate. In the absence of a catastrophic failure by one cell, all cells reach the end of their life at about the same time and there will be no more forwarning of impending battery depletion and in some cases a more rapid depletion rate than was the case when all battery cells were connected in series.

There is another disadvantage to this approach which results from the inherent characteristics of cells which are commonly used in stimulators. These cells generally have a capacity of, for example, about one thousand milliampere hours which, if fully utilized, would operate most cardiac stimulators for about five years. But at the low average output currents prevalent in cardiac stimulators, usually about 30 or 40 microamperes, the rated milliampere hour capacity is not obtainable because the cells at low current drain loads develop high internal losses which prevent full utilization of the rated capacity over an extended period of time. This has compelled surgical replacement of stimulators much earlier than if the current drawn from the cells was slightly higher and the full capacity of the cell were fully utilized.

SUMMARY OF THE INVENTION

An object of the present invention is to overcome the above-noted disadvantages and to retain the advantages of past and present battery connection arrangements in stimulators by providing a battery utilization arrangement which allows one series set of cells to supply substantially all of the stimulator's current requirements at an acceptably high rate and then gradually transfers the current load to another series set of cells when the first set manifests a predetermined output voltage drop due to an increase in internal impedance limiting current output.

A more specific object is to supply stimulus signal generators with current from series connected cell groups which are connected in parallel with each other and which have a diode with different forward voltage characteristics in each series grouping so that the diode with the lowest forward voltage drop will act as a gate to discharge its associated cells before any other series group of cells which is on standby is able to supply appreciable current.

A further object is to incorporate in a stimulator means for imposing substantially all of the current load on a preferred battery or other power source for most of the life of the stimulator and then transferring the load to a source of lesser capacity which conducts current through the body to provide a sensation or response which notifies the patient that the preferred battery has been depleted and that the stimulator is operating on a reserve and limiting supply.

How the foregoing and other more specific objects of the invention are achieved will appear from time to time throughout the course of a more detailed description of preferred embodiments of the invention which will be set forth hereinafter.

In general terms, the invention involves connecting a-c or d-c power sources such as two sets of batteries in parallel for supplying current at the desired voltage to the electronic power supply of a stimulator. Each battery group has a diode connected in series with it. The diodes have different forward voltage characteristics in which case one series group will conduct and supply load current to the stimulator until the voltage of its batteries drops below the forward voltage of the associated diode. Thereafter, the diode with the next lower forward voltage characteristics will begin to conduct and supply current to the stimulator. All of the battery groups are thus discharged consecutively rather than simultaneously. The principles of the invention apply to transferring loads between a-c power sources as well as d-c sources.

In one embodiment a semi-conductor device such as a transistor is substituted for a diode but it cooperates with a diode in series with another group of batteries to cause the batteries to discharge consecutively as when only diodes are used.

A more detailed description of this invention will now be set forth in reference to the drawing.

DESCRIPTION OF THE DRAWING

FIG. 1 is a block diagram of an imlantable stimulator in which the invention may be incorporated;

FIG. 2 is a schematic diagram of one embodiment of a selective battery utilization arrangement for use in stimulators;

FIG. 3 represents the characteristic curves for the different types of diodes used in the circuit of FIG. 2;

FIG. 4 is an alternative embodiment of the selective battery utilization arrangement;

FIG. 5 represents the characteristic curves of the various diodes used in the circuit of the preceding figure;

FIG. 6 is a schematic representation of another alternative embodiment of the invention using batteries of different milliampere hour rating; and FIG. 7 is an alternative embodiment of the invention using batteries of different milliampere hour ratings and incorporating a means for indicating to the patient that the high capacity battery is near depletion and the stimulator is operating on a reserve and limited supply.

DESCRIPTION OF A PREFERRED EMBODIMENT

FIG. 1 shows a block diagram of a typical implantable stimulator in which the new selective battery utilization circuits may be used. This may be a cardiac stimulator, commonly known as an artifical electronic Pacemaker. Stimulators of this type are characterized by having timing, pulse generating and voltage multiplying circuits which are identified collectively by block 10. For brevity, this block will be called a pulse generator 10. Typically, cardiac pulse generators will deliver to the heart 11 stimulus pulses at a rate of about 72 per minute, a pulse amplitude of between 4.0 to 6.0 volts, a pulse width of between 0.5 and 1.0 milliseconds and with a pulse energy of about 30 to 60 microjoules. Stimules pulses are delivered to a heart 11 from the pulse generator's output terminals 12 by means of single or two conductor leads 13 which terminate on the heat or inside of one of its chambers. When only one lead is used, one of the terminals 12 may be connected to an indifferent electrode plate, not shown in this figure, which is implanted near the stimulator in body tissue so that current delivered to the heat by way of the single lead may return through the indifferent electrode plate and to the stimulator through body tissue which intervene between the plate and the heart or other organ that is being stimulated.

The battery supply for the pulse generator is generally designated by the reference numeral 14. The output terminals of the battery supply are marked 15 and 16 and as can be seen in FIG. 1, the pulse generator 10 is connected to these terminals. The battery supply and pulse generator are shown encompassed in a dash-dot line rectangle 17 which symbolizes insulating resin in which the battery supply and pulse generator are customarily encapsulated. The encapsulation is usually coated with silicone rubber for the sake of body compatibility.

FIG. 2 shows a selective utilization battery arrangement in accordance with the invention. The terminals for connecting the load such as pulse generator 10 are again marked 15 and 16. The circuit includes at least two sets of batteries 18 and 19. Each set may comprise a single cell or there may be two or more cells connected in series. Battery terminals having the same polarity are connected to a common conductor 20. The opposite battery terminals are connected with the anodes of diodes D1 and D2 which are connected in series with batteries 18 and 19, respectively. In this example, it is assumed that batteries 18 and 19 are similar; that is, they have the same output voltage and milliampere hour ratings. If they have the same electrical characteristics, their internal impedances are expected to be substantially the same.

A filter capacitor 21 is preferably connected across battery output terminals 15 and 16. Average current drawn by modern cardiac stimulator designs is about 30 microamperes but the individual current pulses may have an amplitude of one milliampere and endure for 1.0 to 2.0 milliseconds in which case filter capacitor 21 serves to smooth out voltage variations due to internal source impedance and provide a substantially constant voltage to the pulse generator as is well known.

Since batteries 18 and 19 are presumed to have the same ratings, they would discharge simultaneously and equally if the forward voltage characteristics of diodes D1 and D2 were the same as is the case in the prior art. In accordance with the invention, however, diodes D1 and D2 have different forward voltage versus current characteristics and as exemplified by the curves shown in FIG. 3 which are marked to show their correspondence with diodes D1 and D2, respectively.

In accordance with one example of the invention, diode D1 may be a hot carrier diode, commonly called a Schottky diode. Diode D2 is a conventional silicon diode in this case. As can be seen in FIG. 3, diode D1 has a forward voltage drop of about 0.16 volts at 0.001 milliamperes and an increase in voltage with current as shown in FIG. 3. On the other hand, conventional silicon diode D2 has a forward voltage of about 0.4 volts at 0.001 milliamperes. By inspecting the characteristics, one may see that diode D2 will not conduct significantly until Schottky diode D1 is delivering almost one milliampere as indicated by the dash line 22. Thus, as long as battery 18 is not depleted appreciably, diode D1 will become conductive before diode D2 and battery 18 will deliver most, if not all of the load current to output terminals 15 and 16. Hence, for a long period, perhaps two years or more, diode D1 and battery 18 will be effectively shunted across diode D2 and battery 19 in which case the latter will not deliver any current unless the drain on battery 18 gets very near or exceeds one milliampere in this example. Of course, if the pulse generator 10 functions in an unintended way and draws current appreciably in excess of one milliampere, the filtering effect of capacitor 21 may be inadequate to smooth the voltage fluctuations and the forward voltage drop of the silicon diode D2 may be exceeded to the extent that it will conduct a minor or fractional amount of total current.

From the foregoing description, one may see that when the voltage on battery 18 drops to the level where it can no longer forward bias D1, the voltage across diode D2 will rise to render it conductive. Usually the load current transfer from battery 18 to battery 19 occurs over a period of time, a small time interval out of the operating life of the stimulator. At the end of this time interval diode D1 is reverse biased so that no current will flow from battery 19 reversely through diode D1 and depleted battery 18. Battery 19 then continues to supply the current requirements of pulse generator 10 until that battery is depleted and replacement of the stimulator is indicated. As indicated earlier, the batteries 18 and 19 having the same milliampere hour capacity rating will have current transfer occurring midway in the operating life of the stimulator. Also, as mentioned earlier, an advantage of the arrangement is that higher current is drawn from whichever battery is being utilized than would be the case if both were being utilized simultaneously and total battery life will be extended since it is then possible to utilize the batteries in a more efficient mode, obtaining greater utilization of battery capacity.

Because of the slightly different forward voltage drops across the two diodes, there will be a small difference in the output voltage appearing on terminals 15 and 16 and this will be reflected in a small change in stimulus pulse rate which will indicate to the physician and patient that the second set of batteries is now in use and that about half of the total battery life has expired. The time at which the stimulator must be replaced because of battery depletion may then be predicted with a higher accuracy than was heretofore possible.

FIG. 4 shows an alternative scheme for utilizing stimulator batteries selectively and consecutively. In this figure, batteries 18 and 19 and capacitor 21 are given the same reference numerals as in FIG. 2 since these elements may be assumed to be similar for purposes of the present discussion. In FIG. 4, three diodes, D3, D4 and D4 are used. All diodes may be identical conventional silicon diodes or they could be combinations of such diodes, Schottky diodes, germanium diodes or any other with the proper voltage characteristics. By connecting suitable diodes such as conventional diodes D3 and D4 in series, however, their total forward voltage characteristic will exceed that of diode D5 as can be seen in FIG. 5 which is a plot of their combined and individual characteristics respectively. In this case, diode D5 and battery 19 will deliver the load current to terminals 15 and 16 initially and the high total forward voltage drop of D3 and D4 in series will preclude current from being delivered by battery 18 until battery 19 is substantially depleted or subjected to heavy load currents before that time. Thus, one may see in FIG. 5, that diode D5 has a forward voltage drop of about 0.4 volts at 0.001 milliamperes, so battery 19 supplies the load current at this time. When battery 19 depletes or is drained instantaneously in excess of about one milliampere, the voltage across this diode exceeds the approximately 0.8 volts which will forward bias series connected diodes D3 and D4 and current will be drawn from battery 18. Therefore, battery 18 will remain in a standby state for about half the total battery life of the stimulator and will supply part or all the current when battery 19 is near depletion. The circuit of FIG. 4 is as advantageous insofar as extending battery life is concerned as in the FIG. 2 example because of the higher current drain which results from utilizing the batteries consecutively rather than simultaneously as when all batteries are connected in parallel with similar series diodes or when all batteries are connected in a single series arrangement. The small drop in output terminal voltage that occurs when diodes D3 and D4 are in use will alter the pulse rate of the stimulator and indicate to the patient that about half of the expected battery life has expired.

It will be understood by those skilled in the art that additional batteries and additional series connected diodes may be added to the circuits shown in either FIGS. 2 or 4 so that more than two batteries which may have various capacity ratings can be utilized to depletion consecutively. It is only necessary in such cases to use one or more diodes in series with them which have different forward voltage or impedance characteristics.

The principles of the invention are used in the battery supply which is shown in FIG. 6. This arrangement contemplates using one battery 25 which may have a one thousand milliampere hour rating in conjunction with another battery 26 which may have the one hundred milliampere hour rating, for example. A silicon diode D6 is connected in series with battery 26. This diode may have a minimum forward voltage characteristic of about 0.4 volts. The emitter to collector circuit of a transistor Q1 is in series with battery 25. A large filter capacitor such as one having a capacity of 10 microfarads or larger is connected across output terminals 15 and 16. A high value resistor 28 on the order of about 4.7 megohms may be connected in the base circuit of transistor Q1 so that emitter to base biasing current will render transistor Q1 conductive causing a low saturation voltage, approximately 0.2 volts, to occur between the emitter and collector terminals and to supply current to the load terminals 15 and 16. A small filter capacitor 29 is preferably connected in shunt with resistor 28 to improve pulse current stability. In a typical case, assuming use of a silicon transistor Q1, the emitter to collector voltage will be about 0.2 volts and battery 25 will supply substantially all of the current to the pulse generator load. When the available voltage from battery 25 drops in due course due to battery depletion, transistor Q1 will gradually turn off and the shunting effect which this transistor has on the battery 26 and diode D6 circuit will be removed. A voltage rise in excess of about 0.4 volts across diode D6 will result in battery 26 accepting the load in the same fashion as in connection with the previously described embodiments.

In the FIG. 6 embodiment, average current drain may be on the order of 30 microamperes but instantaneous current during generation of a pulse may be as high as 5 milliamperes in which case the relatively high impedance of the battery 25 and transistor Q1 source might seriously affect voltage regulation. It is for this reason that a large stabilizing filter capacitor 21' is used in this case.

In the FIG. 6 arrangement, it is contemplated that battery 25 will supply load current for the greater part of the total life of the two batteries 25 and 26 and that battery 26 will only be called upon to deliver current for about 10 percent of the total battery life. The change in stimulus pulse rate which occurs when the preferred battery 25 is depleted and battery 26 is in use serves as an indication that the stimulator should be replaced in the not-too-distant future because the stimulator is operating on the reserve and limited supply.

The alternative embodiment shown in FIG. 7 uses the above-discussed principles of the invention but is distinguished by its ability to cause a mild but perceptible electric sensation or response such as a muscle twitch in a restricted part of the patient's body to indicate that the preferred battery is depleted or nearing depletion. The advantage of this system is that it induces a patient to seek replacement of the stimulator before a crisis develops due to battery depletion. In FIG. 7, the preferred or main battery 35 may have a one thousand milliampere hour rating. It has a Schottky diode D7 connected in series with it. As expalined earlier, the forward voltage characteristic of this diode is about 0.2 volts at low current levels. Battery 35 delivers current at the desired voltage to filter capacitor 36 and to output terminals 15 and 16 which connect with a stimulus pulse generator 10. As in the previous cases, the output terminals 12 of the pulse generator may be connected directly to the heart by intravascular or myocardial leads 13 which are symbolized in FIG. 1. Only battery 35 is relied upon for stimulus energy. However, there is an auxiliary battery 37 connected in series with a diode D8 which may be a conventional silicon type having a forward voltage characteristic of about 0.4 volts. Battery 37 preferably has low capacity such as 50 millampere hours or less. The negative terminal of battery 37 is connected to a lead 38 which ends in a terminal 39 which is exposed to body tissue. An indifferent electrode plate 40 may also be implanted in body tissue near electrode 39 but remote from the heart or other organ that is being stimulated by reason of it being connected to pulse generator terminals 12. A stimulating electrode could be substituted for plate 40. In this arrangement, the series circuit including terminal 39, lead 38, battery 37, diode D8, the load of cross terminals 15 and 16 and common conductor 41 will not conduct as long as the voltage on battery 37 is high enough to forward bias diode D7 sufficiently to shunt the circuit just recited and to reverse bias diode D8. As battery 35 depletes, however, some current will begin to flow from battery 37 through diode D8 and back to the battery across electrodes 40 and 39 which are intervened by responsive body tissue. A small current flow will then begin between electrodes 39 and 40 and this may be substantially imperceptible to the patient initially. As the voltage on battery 35 drops further, however, more current to the load will flow between electrodes 39 and 40 and the tingling sensation or muscular twitch caused by conduction through the tissue becomes more noticeable by the patient. The patient is thereby induced to seek a replacement of the stimulator by his physician at the earliest possible opportunity or convenience.

In summary, several examples of circuits for utilizing power sources selectively have been described. Batteries have been indicated as exemplary sources but those skilled in the electronics art will appreciate that the principles of the invention are applicable to selective utilization of other d-c and a-c sources as well. It will also be evident that for the diodes mentioned various other types of unilaterally conductive devices could be substituted provided the proper different forward voltage characteristics can be developed. The polarity of the diodes, batteries and electrodes could also be opposite from those indicated in the description as those skilled in the art will recognize. Each circuit uses combinations of diodes or other non-linear devices for transferring load current from one power source to another. A scheme has been shown for giving the patient a pronounced indication that a main battery is depleted and that he is on a reserve supply. The circuits are distinguished by permitting higher current drain from batteries to thereby extend their life and effect greater utilization of their capacity.

Although several embodiments of the invention have been described in considerable detail, such description is to be considered illustrative rather than exclusive, for the invention may be variously embodied and is to be limited in scope only by interpretation of the claims which follow.

I claim:

1. A body implantable body organ stimulator comprising:
   a. a stimulus signal generator having first and second input terminals and also having output terminals the latter of which are adapted to be connected in a circuit with an organ to be stimulated,
   b. a first electric source having a certain relatively high milliampere hour rating,
   c. a first diode means having an anode and a cathode, the anode being connected to the positive terminal of said first source,
   d. a second electric source having a milliampere hour rating that is less than said first source's rating,
   e. a second diode means having an anode and a cathode, the anode being connected to the positive terminal of said second source and the cathodes of both of said diodes being connected together and to said first input terminal of said stimulus generator, said first diode means having a lower forward voltage drop than said second diode means,
   f. the negative terminal of said first source being connected to said second input terminal of said stimulus signal generator,
   g. a body tissue contacting electrode connected to said negative first source terminal,
   h. another body tissue contacting electrode connected to the negative terminal of said second source,
   i. the said second diode means and second source being rendered conductive when the voltage drop in the first source and diode means exceeds a predetermined value, whereupon current is conducted through body tissue.

2. A body implantable organ stimulator comprising:
   a. stimulus signal generator means having operating voltage input terminals and output terminals the latter of which are adapted to be connected with an organ to be stimulated,
   b. a first voltage source and a first substantially unidirectionally conductive means that has a certain forward voltage drop connected in a series circuit with said first source, said series circuit being connected across said input terminals,
   c. a second voltage source whose voltage is nominally the same as the first source and a second substantially unidirectionally conductive means that has a different forward voltage drop than said first unidirectionally conductive means, said second conductive means being connected in a second series circuit with said second source, said second series circuit being connected across said input terminals,
   d. both of said unidirectionally conductive means being conductive in the same direction toward one said input terminal of said stimulus signal generator and said first voltage source supplying substantially all of the load current to said input terminals until the forward voltage drop of its circuit exceeds the forward voltage drop of said second circuit whereupon said second voltage source will supply substantially all of the load current, and
   e. a pair of electrodes connected respectively to corresponding polarity sides of said voltage sources and being spaced from each other and included in said second series circuit which includes said second voltage source and second unidirectionally conductive means, said spaced electrodes thereby being adapted to contact body tissue and to conduct between them for causing a perceptible body sensation when the forward voltage drop of said first series connected voltage source and first unidirectionally conductive means exceeds a predetermined value.

\* \* \* \* \*